Oct. 20, 1970  N. B. MITCHELL, JR  3,534,997
EXPANSIBLE TRAILER
Filed Dec. 20, 1968  4 Sheets-Sheet 1
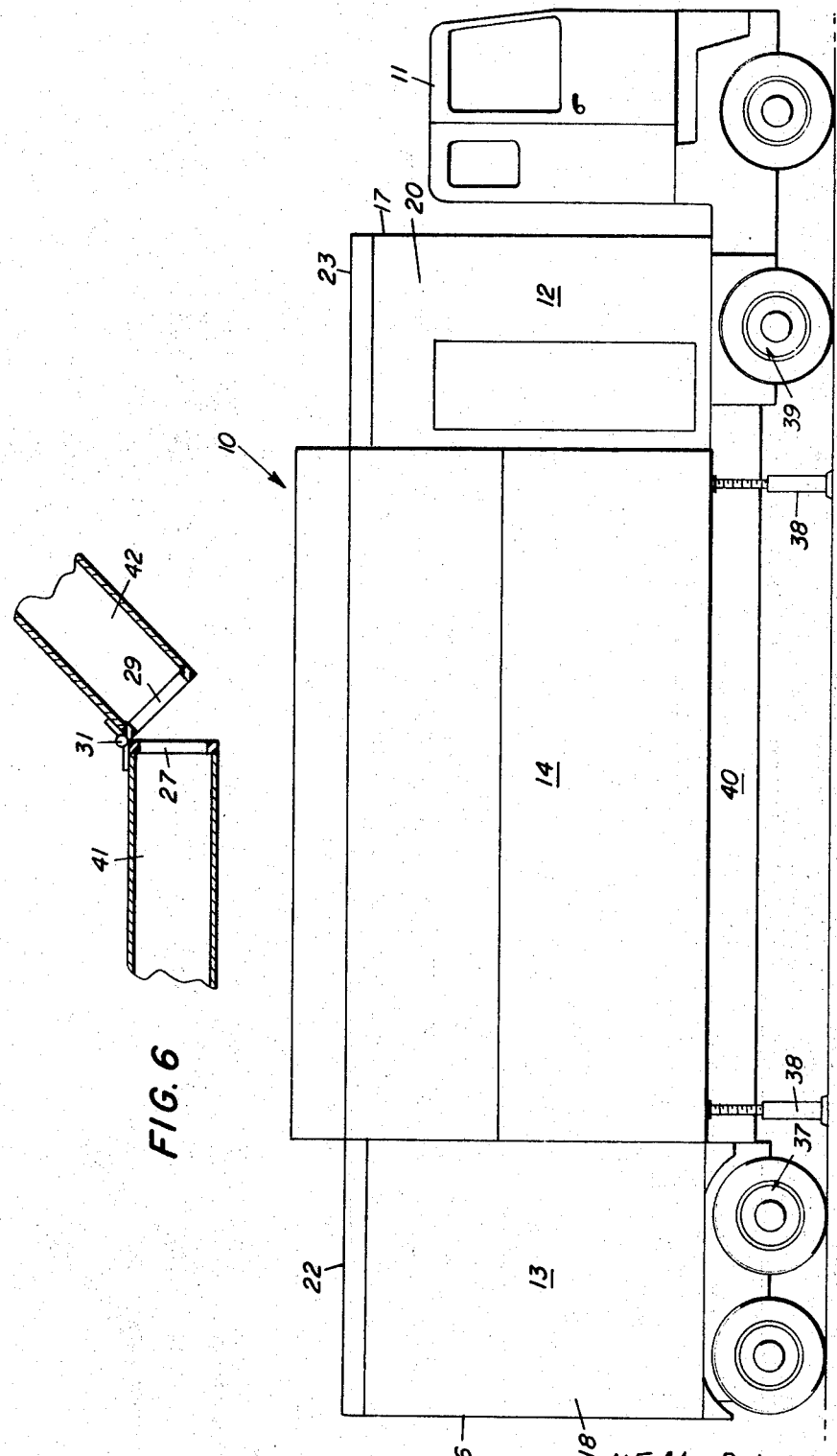
INVENTOR
NEAL B. MITCHELL, JR.
BY
ATTORNEYS Oct. 20, 1970  N. B. MITCHELL, JR  3,534,997

EXPANSIBLE TRAILER

Filed Dec. 20, 1968  4 Sheets-Sheet 2

INVENTOR
NEAL B. MITCHELL, JR.
BY
ATTORNEYS

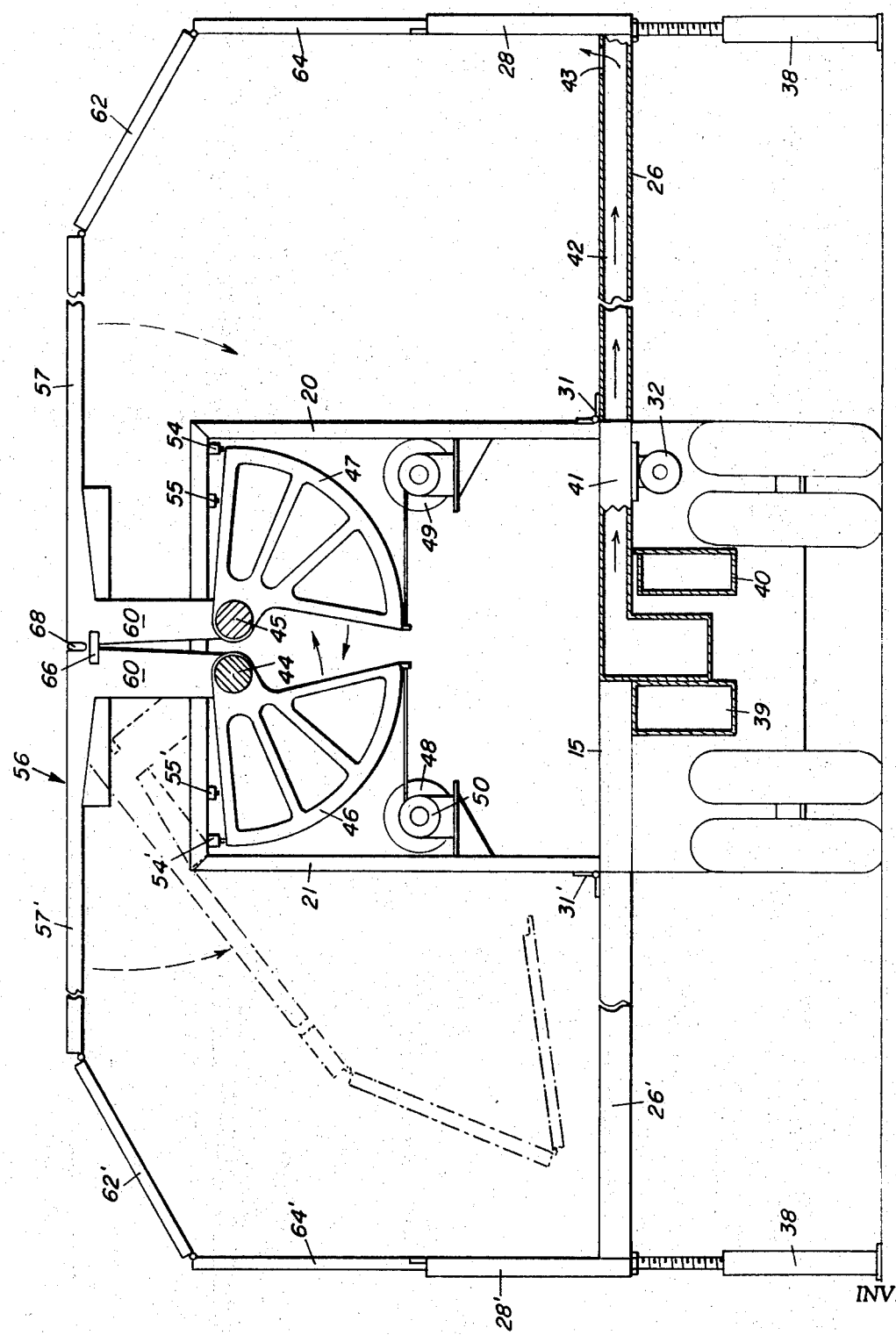

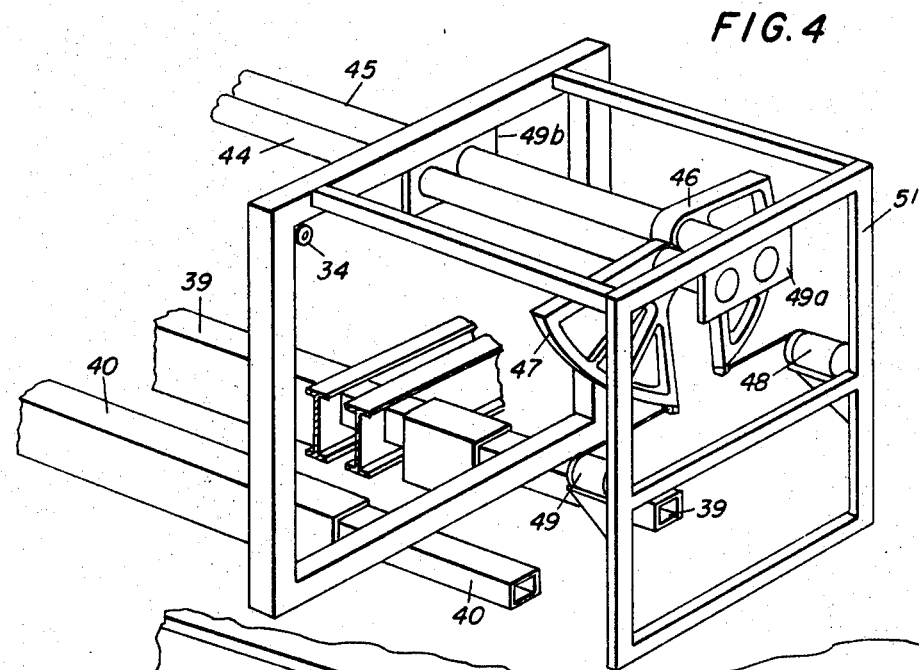
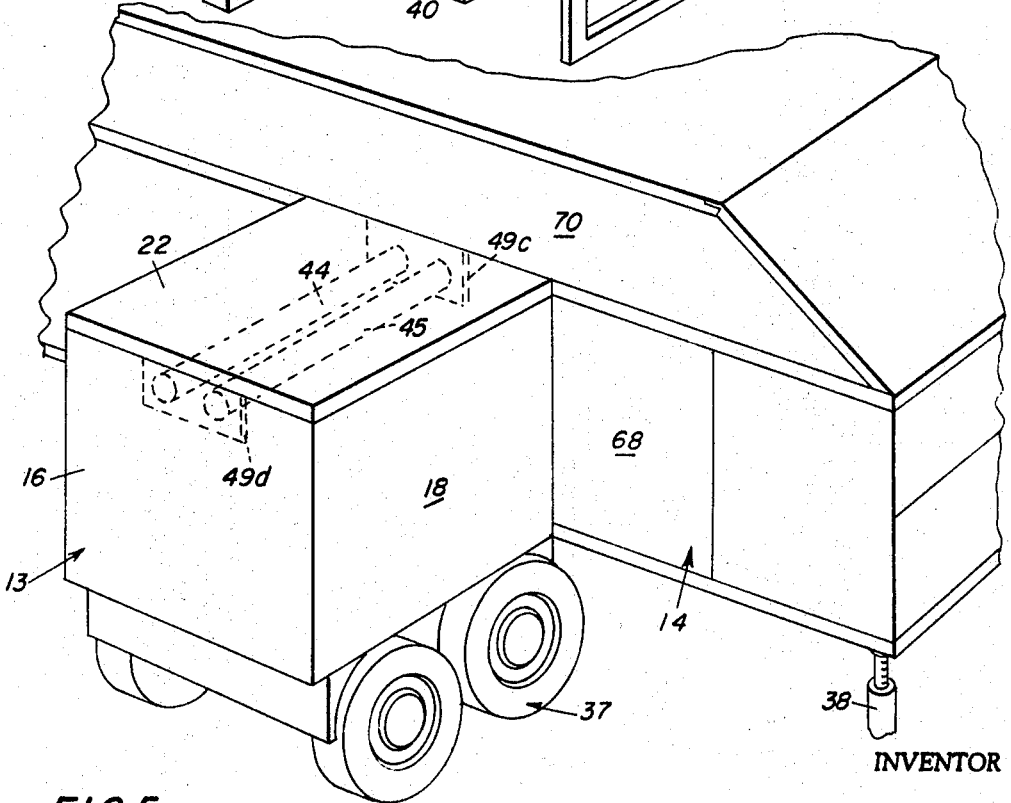

United States Patent Office 3,534,997
Patented Oct. 20, 1970

3,534,997
EXPANSIBLE TRAILER
Neal B. Mitchell, Jr., Lexington, Mass., asignor to Neal Mitchell Associates, Inc., Cambridge, Mass., a corporation of Delaware
Filed Dec. 20, 1968, Ser. No. 785,501
Int. Cl. B60p 3/32
U.S. Cl. 296—23                         3 Claims

ABSTRACT OF THE DISCLOSURE

A mobile expansible trailer having a pair of L-shaped floor extension units pivotally connected to opposite side edges of the trailer floor and constituting roof and side walls when the trailer is in travel position, a pair of parallel rotatable torsion bars extending between the end walls of the trailer and carrying a pair of roof extension units which are nested within the floor extension units in the travel position and wherein said floor and roof extension units provide a trailer of increased height and width when the trailer is in the expanded position.

Various types of expansible trailer homes or portable shops are known to the prior art which provide an expanded facility which can be collapsed to lawful dimensions for highway travel. In the prior art structures, several principles of expansion have been utilized. Some have used telescoping sections, others have used attachable panels while still others have used complex pivoting and sliding sections. Moreover, many of the prior art units include numerous sections and panels which normally necessitate the use of inefficient fastening and sealing means.

This invention relates generally to an expansible trailer and more particularly relates to a trailer structure which is expansible both laterally and vertically.

A primary object of the present invention is to provide an expansible trailer which is adapted for use as a semi-permanent classroom facility for housing relatively large groups of people for extended periods of time.

Another object of the invention is to provide a laterally and vertically expandable trailer having floor extension units which form portions of the walls of the trailer when the latter is in the folded position.

Another important object of the present invention is to provide an expansible trailer having a pair of floor extension units which form a part of the side and roof when the trailer is in the folded position and a part of the floor and side walls when the trailer is in its travel position.

A further objective of the invention is to provide an expansible trailer having a central plenum system in the floor unit thereof, distribution ducts in floor extension units and means to automatically communicate and seal ducts with the plenum when trailer is expanded to its erected position.

A further object of the invention is to provide an expansible trailer having a pair of L-shaped roof extension units rigidly secured to and pivotable with a pair of longitudinally extending torsion bars whereby the roof units are easily and efficiently erected without distortion.

Trailer units of normal construction are lengthy and, therefore, have a substantial distance between their supporting axles. It has become conventional to construct such trailers with rigid beam-like walls whereby the trailer unit itself can act as a self-supporting span. Another objective of this invention is to provide further supporting means between the trailer axles whereby the trailer walls are not required to be of a rigid load-bearing construction.

These and other objects of the invention will become more apparent to those skilled in the art by reference to the following detailed descripion when viewed in light of the accompanying diagrammatic drawings wherein:

FIG. 1 is a side elevation view of the tractor and trailer in its expanded or erected position;

FIGS. 2A througa 2E are end elevations of the trailer showing progressive stages in the expansion operation;

FIG. 3 is an end view, partially in section, showing means for expanding the roof extension units;

FIG. 4 is a perspective view of the basic trailer framework;

FIG. 5 is a perspective view of the rearward end of the trailer in the expanded position; and FIG. 6 is a cross section of a duct sealing means.

Figure 2A:
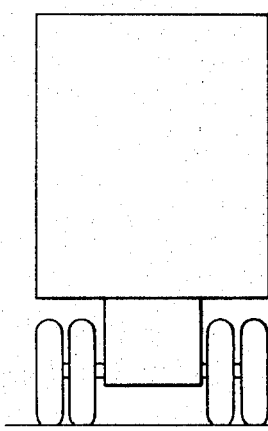
Figure 2B:
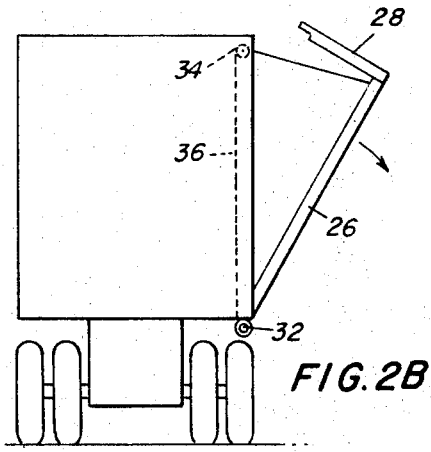
Figure 2C:
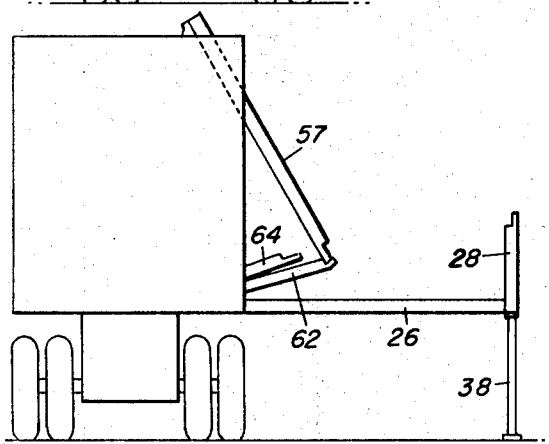
Figure 2D:
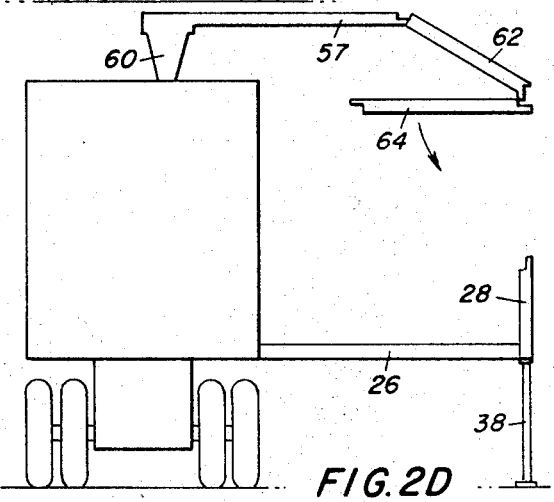
Figure 2E:
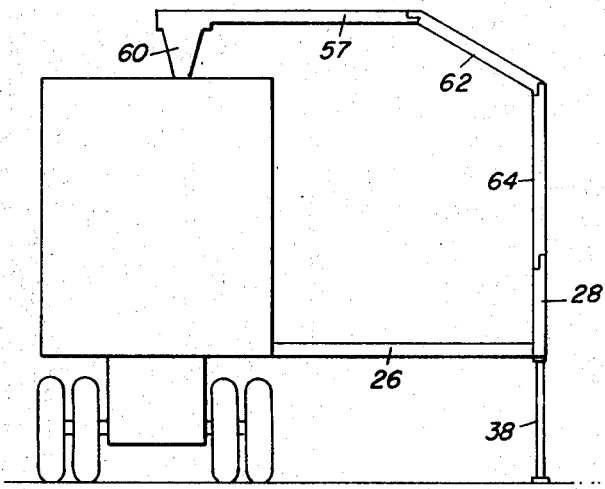

Referring now to the drawings, wherein like numerals indicate like parts, the numeral 10 indicates generally the trailer of the present invention. The trailer is adapted to be secured to and disconnected from a prime mover 11 in the usual manner. The trailer is comprised of three major components; namely, a forward compartment 12, a rear compartment 13 and an expandible compartment 14. A floor 15 extends throughout the length of the trailer. The forward compartment 12 is formed of end wall 17 and fixed side wall sections 20 and 21 and roof section 23. The rear compartment is formed of end wall 16, sides 18 and 19 and the roof 22. The compartment 12 can conveniently provide office and storage space and the rear compartment 13 conveniently provides a housing for the mechanical equipment such as the air conditioner, the electricity generator and other electrical units servicing the trailer.

Pivotally mounted to the longitudinal side of the floor 15, between the forward and rear compartments are a pair of L-shaped floor extension units 24 and 24'. When the trailer is in its travel position, these units form the trailer side walls and mating roof sections. Each floor extension unit 24 consists of a base panel 26 and a top panel 28 rigidly secured thereto at an angle of 90°. The inner end of base panels 26 are pivotally connected to the floor 15 by conventional hinge means 31. The hinges are located so that upon lowering units 24 to their expanded position, the inner surfaces of panels 26 are coplanar with the upper surface of the central floor member 15. Note that the elements to right and left of the trailer are substantially the mirror image of one another. In some instances only the right half of the trailer will be described in detail and the corresponding elements on the left will be indicated on the drawings with prime marks.

In order to lower and raise the units 24, a motor driven drum 32 is carried by the trailer floor structure. A rotatable sheave 34 is mounted on a bracket at the intersection of side 20 and roof 23 of the forward compartment 12 where the forward compartment and expansion compartment join. A cable 36, whose free end is affixed at the juncture of the panels 26 and 28, is operably connected to the drum 32. This cable-sheave arrangement facilitates the lifting and lowering for the floor extension units. A suitable control switch (not shown) is located in a conveniently accessible area to halt the lowering of the side panels at their proper elevations. A plurality of adjustable jacks 38 are mounted beneath the outer ends of the floor extension units to provide support therefor.

In order to compensate for the lack of rigidity in the trailer because of the discontinuity caused by the expansible section 14, a pair of longitudinal box beams 39 and 40 are provided beneath the floor 15 for the full length of the van between the forward and rear axles. As can be seen, in FIG. 1, the beams are securely mounted directly to the forward and rearward trailer wheel assemblies 37 and 39.

Extending beneath floor unit 15 of the trailer is a central air duct 40 having one end adapted to receive the output from an air conditioning unit located in the rear compartment 13. The air conditioning unit is conventional and is of such capacity as to provide forced air heating or cooling sufficient to meet normal classroom demands. A plurality of branch ducts 41 extend laterally through the floor 15 from the in duct 40 and open to the longitudinal side edges of the floor. A plurality of duct extensions 42 extend laterally through the side panels 26 from openings on the hinged edge of the panels 26 to openings 43 on the interior surface of the side panel adjacent panel 28. The openings of panels 41 and 42 are adapted to register with one another when the floor extension units are lowered. In order to accomplish an efficient transfer of air at the registration of ducts, the floor ducts 41 are provided at their outer ends with a flexible grommet 27 and the wall ducts with flexible grommets 29. As seen in FIGS. 3 and 8 as the L-shaped floor extensions are lowered, the opposing grommets mate with one another forming a sealing registry.

After the floor extension units have been lowered into position and jacks 38 are emplaced, the roof extension units are provided to their expanded positions. A pair of parallel torsion bars 44 and 45 extend the length of the trailer and are rotatably supported at each end in brackets 49a–49d in the trailer framework 51. At their ends adjacent the forward end wall 14, the torsion bars are each provided with pie-shaped rocker arms 46 and 47. The rocker arms 46 and 47 are rigidly secured to their respective torsion bars and are longitudinally offset whereby the arms swing in parallel adjacent planes. By swinging a selected rocker arm the desired amount about its longitudinal axis, the torsion bar is caused to turn through a selected arc. In order to effect such movement, a pair of wall-mounted reversible electric motors 48 and 49 are each connected to a drum 50 via cable 52. Each cable is affixed at one end to a rocket arm so that upon actuation of the motor, the rocker arm and its torsion bar are pivoted automatically within a range of movement defined by limit switches 54 and 55. The electrical circuitry embodied in this arrangement has been omitted for clarity, it being recognized that such circuitry is within the skill of the average electrician.

Extending radially outwardly from the torsion bars are a plurality of spaced struts 60 and 60'. At their outer ends, the struts 60 and 60' carry the roof extension units 57 and 57'. A panel 62 is hingedly secured to the end of roof extension 57 and a panel 64 is hingedly secured to the panel 62. In like manner, the panel 57' carries panels 62' and 64'. The panels are swung from their folded positions where they lay against one another within the trailer to an expanded position where the second extension panels 64 and 64' are approximately normal to the roof extensions and are secured to the upper ends of the top panels 28 and 28' of the roof extension unit 26 and 26'.

The various steps of expansion of the trailer from the folded or collapsed travel position to the expanded position are shown in progression in the drawings, FIGS. 2A through 2E.

In the folded position of FIG. 2A, the floor extension units 24 and 24' are in their fully retracted or nested position and form the exterior roof and sidewalls of the trailer body. In this rested position the roof extension units 56 and 56' are positioned with their struts 60 and 60' horizontal and the side panels vertical. A weathertight seal and suitable locking and latching means are provided between the inner ends of the top panels 28 while the trailer is in this locking position.

In operation the nested trailer is transported by prime mover to a designated location. After the preparing of the location; i.e., leveling or cleaning if necessary, the unlatching of locks, and the removing of appropriate sealing strips, the floor extension units 24 and 24' are lowered by the motor controlled cables 36 until the inner surface of panels 26 is level with the floor 15. The jacks 38 are placed under the panels 28 and adjusted until accurate leveling is obtained. With the floor extension units in place, the motors 48 and 49 are activated to swing the roof extenson units outwardly and upwardly until the panels 58 and 58' are horizontal. The hinged extension panels are next manipulated to their final position. Assembly is complete with the addition of lateral wall panel sections as shown at 68 and 70 in FIG. 5.

The expansion operation described enables institutions to provide complete and self-contained classrooms to remote areas. The unit can also be used to augment the classroom facilities of crowded schools without entailing the delay of permanent structures. The trailer is emplaced for as long as necessary and the prime mover may be displaced once its transport mission is complete. The expansion of the trailer not only increases the height and width of the new enclosure to comfortable dimensions but the enclosure itself is fully climate controlled by the air conditioning and duct system so that the classroom environment is idealized.

What has been set forth above is intended as exemplary to enable those skilled in the art in the practice of the invention and it should therefore be understood that, within the scope of the appended claims, the invention may be practiced in other ways than as specifically described.

What is new and, therefore, desired to be protected by Letters Patent of the United States is:

I claim:

1. An expansible trailer comprising a floor, a pair of L-shaped extension units each comprised of a first member and a second member, means pivotally connecting said units to opposite longitudinal side edges of said floor, said trailer having a travel position wherein said first and second members constitute the roof and side walls of the trailer, said trailer having an erected position wherein said first member folds into alignment with said floor and said second members comprise a portion of a vertical sidewall, a pair of end walls fixed to and extending vertically upwardly from the lateral ends of said floor, a pair of parallel rotatable torsion bars extending between said end walls, a pair of roof extension units each comprising a top member and a side member, means securing a first edge of each of said top members to one of said torsion bars, said roof extension units nesting within said floor extension units with said roof extension top and side members respectively parallel to said floor extension top and side members when the trailer is in the folded condition, means to pivot said torsion bars to move said top member to a position parallel to said floor and second means to secure said side members to said second members.

2. The invention as described in claim 1 wherein said second means includes panels pivotally connected to the free end of said roof extension side members for engagement with the free end of said second members when said trailer is in the erected position.

3. The invention as described in claim 2 including means carried by said trailer for conditioning air, first duct means beneath said floor connected to said air conditioning means and extending longitudinally of said trailer for carrying said conditioned air, second duct means within said floor communicated with said first duct means and extending transversely of said trailer and having outer ends opening to the longitudinal side of said floor, third duct means within said floor extension side members, said third duct means having one end opening to the said free edge of the floor extension side member and the other end opening on the inner wall of the floor extension side members, means providing a sealing registry between said third duct means and ends of said second duct means when said trailer is in its erected position.

References Cited

UNITED STATES PATENTS

| | | | |
|---|---|---|---|
| 3,352,596 | 11/1967 | Hanson | 296—27 |
| 2,831,722 | 4/1958 | Escoto | 296—23.7 |
| 2,832,637 | 4/1958 | Decosse | 296—23.7 |

PHILIP GOODMAN, Primary Examiner

U.S. Cl. X.R.

52—66; 296—26